United States Patent [19]
Brümmer et al.

[11] Patent Number: 5,947,483
[45] Date of Patent: Sep. 7, 1999

[54] SEAL FOR THE GAS-TIGHT MOUNTING OF AN INTAKE MANIFOLD ON THE CYLINDER HEAD OF AN INTERNAL COMBUSTION ENGINE

[75] Inventors: Michael Brümmer, Laudenbach; Klaus Döhring, München, both of Germany

[73] Assignee: Firma Carl Freudenberg, Weinheim, Germany

[21] Appl. No.: 08/941,330

[22] Filed: Sep. 30, 1997

Related U.S. Application Data

[63] Continuation of application No. 08/667,134, Jun. 20, 1996, abandoned, which is a continuation of application No. 08/165,150, Dec. 10, 1993, Pat. No. 5,590,888.

[51] Int. Cl.$^6$ .................................................... F16J 15/08
[52] U.S. Cl. ........................... 277/592; 277/591; 277/594
[58] Field of Search .................................. 277/591, 592, 277/593, 594; 123/184.21, 184.31, 184.38, 184.61

[56] References Cited

U.S. PATENT DOCUMENTS

| | | | |
|---|---|---|---|
| 3,667,432 | 6/1972 | Greathouse | 123/184.61 |
| 3,944,235 | 3/1976 | Gordon | 277/22 |
| 4,101,138 | 7/1978 | Gaggliano | 277/11 |
| 4,635,949 | 1/1987 | Lucas et al. | 277/235 B |
| 4,728,110 | 3/1988 | Nakasone | 277/213 |
| 4,813,687 | 3/1989 | Nakayama et al. | 277/26 |
| 4,846,482 | 7/1989 | Blodgett et al. | 277/235 B |
| 5,003,933 | 4/1991 | Rush, II et al. | 123/52 MC |
| 5,005,535 | 4/1991 | Binversie | 123/52 M |
| 5,220,889 | 6/1993 | Ampferer et al. | 123/184.21 |

FOREIGN PATENT DOCUMENTS

| | | |
|---|---|---|
| 2-27150 | 1/1990 | Japan . |
| 4337163 | 11/1992 | Japan . |

*Primary Examiner*—Daniel G. DePumpo
*Attorney, Agent, or Firm*—Kenyon & Kenyon

[57] ABSTRACT

A seal of an elastomeric material used to mount an intake manifold in a gas-tight manner on the cylinder head of an internal combustion engine is disclosed. The seal is formed to blend together in one piece and is located in position on the side of the intake-manifold flange facing the cylinder head. The seal has sealing surfaces, which sealingly surround the periphery of the intake pipes of the intake manifold during normal operational use. The sealing surfaces are interconnected by web segments, and at least one of the web segments is designed in one area of its extent to act as a linear tolerance compensation segment, to be flexurally soft and/or capable of folding together.

8 Claims, 5 Drawing Sheets

SEAL FOR THE GAS-TIGHT MOUNTING OF AN INTAKE MANIFOLD ON THE CYLINDER HEAD OF AN INTERNAL COMBUSTION ENGINE

This application is a continuation of application Ser. No. 08/667,134, filed on Jun. 20, 1996, now abandoned, which is a continuation of Ser. No. 08/165,150 filed on Dec. 10, 1993, now U.S. Pat. No. 5,590,888.

BACKGROUND OF THE INVENTION

1. Field of the Invention

The present invention relates to a seal of an elastomeric material used to mount an intake manifold in a gas-tight manner on the cylinder head of an internal combustion engine. The seal is formed so as to blend together in one piece and can be located on the side of the intake manifold flange facing the cylinder head. The seal has sealing surfaces, which sealingly surround the periphery of the intake pipes of the intake manifold during normal operation.

2. Description of Related Art

Seals for intake manifolds are generally known and are designed, for example, as flat seals. These seals are intended to seal off the separating joint between the intake manifold and the cylinder head so as to render the joint gas-tight. Such seals, however—when made of elastomeric materials—are subject to manufacturing tolerances and shrinkage that are conditional upon the process of manufacturing. Moreover, water absorption can cause these seals to stretch. The above properties require costly assembly procedures, when the aim is to achieve good sealing results over a long service life. This is unsatisfactory from the standpoint of assembly engineering and economics. These disadvantages become even more evident when intake manifolds of polymeric materials are used. Since both the seal and the intake manifold are manufactured of a plastic material, the manufacturing tolerances and shrinkage often combine to make it impossible to fix the seal exactly in position between the intake manifold and the cylinder head, which cylinder head is generally constructed of a metallic material. Accordingly, it is difficult to achieve a good seal between the intake manifold and the cylinder head.

SUMMARY OF THE INVENTION

The underlying objective of the present invention is to develop a seal so as to guarantee gas-tight mounting of an intake manifold on a cylinder head during the entire service life of the internal combustion engine. The present invention is especially useful when intake manifolds of a polymeric material are used—and provides a good seal in spite of the tolerances that are conditional upon manufacturing and the shrinkage that occurs following manufacturing of the seal.

To achieve this objective, the sealing surfaces of the present invention are interconnected by web segments, and at least one of the web segments is designed in one area to be flexurally soft and/or capable of folding together, to compensate for linear tolerances. Manufacturing tolerances and material-related shrinkage can be easily compensated for by integrating axially flexurally soft and foldable linear-tolerance compensation in the seal. To ensure a perfect seal in the area between the intake manifold flange and the cylinder head, the linear tolerance compensation is arranged outside of the sealing zones, in those web segments which interconnect the sealing surfaces, thus creating a one-piece formed seal.

Because the seal is formed in one piece, it is easy to manufacture, easy to manipulate during assembly, and is capable of being installed exactly at the designated location.

One advantageous refinement of the present invention provides for the linear tolerance compensation feature to have an undulated shape. Since the tolerances to be compensated for are within the range of +0.75 to −0.25 millimeters, three folds generally suffice for the compensation needed.

The seal is preferably used in applications in which the intake pipe and the cylinder head have at least two inlet ports. In the case of an in-line four-cylinder engine or a V-8 engine, the seal can be characterized by four sealing surfaces that are arranged in series, the two inner sealing surfaces being joined by at least one middle web segment and the linear tolerance compensation features being arranged in the web segments between the outer and the adjacent inner sealing surfaces. It is advantageous that the two sealing surfaces which seal off the two inner intake pipes are decoupled in terms of tolerance from the outer sealing surfaces. The comparatively small length of the two middle sealing surfaces, which are joined by a middle web segment, can be easily manufactured while avoiding undesirably large tolerances. However, given a one-piece construction of the two inner sealing surfaces together with the two outer sealing surfaces, no tolerance compensation would mean considerable manufacturing expenditure to ensure good sealing results, which is not satisfactory from the standpoint of economics.

A seal having an advantageous linear tolerance compensation can, as previously described, be used for an in-line four-cylinder engine, but may also be used advantageously for internal combustion engines having three or more cylinders.

Generally, it is possible for the seal to consist of only an elastomeric material. To improve the working properties and inherent stability, the sealing surfaces and the middle web segment can be adhesively joined and/or connected through form locking to a seal support constructed of a polymeric material. This refinement provides the seal with substantial inherent stability in those areas used to provide sealing action between the intake manifold and the cylinder head and, as a result, makes it easy to manipulate the seal so that installation is simplified.

When a seal support is used, it can be provided in the area of the web segments having linear tolerance compensation. The greater inherent stiffness of the polymeric material in comparison to the elastomeric material guarantees that the linear tolerance compensation is allocated with dimensional stability to the seal without losing advantageous working properties.

In another advantageous refinement of the present invention, the seal support can be provided on the sides facing the intake manifold and the cylinder head with sealing surfaces and have a profile which opens out in a U-shape in the direction of the intake manifold and the cylinder head, respectively, and which at least partially surrounds the elastomeric material. A profile formed in such a manner assures excellent inherent stability for the seal during assembly, in which case the seal support has at least one, and preferably a plurality, of perforations that are penetrated by the elastomeric material of the sealing surfaces. By localizing the seal support centrally between the sealing surfaces a uniform contact pressure and, therefore, sealing action is produced for each sealing surface.

The lateral sides of the seal support, which project in the direction of the intake manifold and the cylinder head, can be designed as limit stops. The limit stops each have a smaller extent than the sealing surfaces in the same direction. In this manner, during the installation of the seal between the intake manifold and the cylinder head, the contact pressure on the elastomeric material is limited to a measure that is optimal for a sealing action by contact of the limit stops. Moreover, the advantage of such a refinement is that the elastomeric material is protected from external influences for the entire service life, because it is arranged in the U-shaped, opened profile of the seal support.

The seal support and/or the flexible material of the seal can have at least one positioning projection that is premolded in one piece on the side facing the intake manifold. This positioning projection can be forced to engage a recess in the flange that opens toward the cylinder head. The sealing surfaces are preferably provided with positioning projections that are distributed uniformly in the circumferential direction to achieve a good, gas-tight connection of the intake pipe and the cylinder head in this area, which is particularly important for the sealing action. In addition, the advantage of the positioning projections is that they enable the intake manifold and the seal to be preassembled before the final assembly operation. This method is particularly advantageous when the intake manifold consists of a polymeric material, since the recesses required to accommodate the positioning projections can be directly molded during manufacturing. The recesses preferably have a smaller opening cross-section than the positioning projections. This refinement allows the seal and the intake flange to be press-fit together. This further simplifies the installation of the preassembled part on the cylinder head of the internal combustion engine. If the positioning projections are made in one piece with the seal support, then they penetrate the elastomeric material in the direction of the intake manifold. Within the scope of the present invention, however, positioning projections are preferably made of the elastomeric material of the seal. Overall therefore, the flexibility of the positioning projections allows the seal to be easily localized on the flange of the intake manifold pipe.

One advantageous further development provides:
1. for the middle web segment to be designed as a sealing bridge,
2. for the seal support and the sealing bridge to be provided with at least one shared perforation,
3. for the perforation to be formed as a connection, and
4. for one end of the connection to be connected to the crankcase ventilation of the internal combustion engine, while the other end of the connection is connected to at least one inlet port of the internal combustion engine.

It is advantageous in this case that the connection is integrated directly in the seal and that the crankcase gas is fed directly into the intake pipes adjacent to the cylinder head. This refinement and the heat-radiating cylinder head guarantee that the crankcase gas will be safe from icing when it is fed into the intake pipes. Thus, any excessive pressure in the crankcase and resultant damage will be reliably avoided.

At least the sealing surfaces and the sealing bridge are delimited in each case by two circumferential sealing lips. These sealing lips are adjacent to one another with clearance and protrude in the direction of the surface to be sealed. The positioning projections are preferably arranged in the area between the sealing lips, which mutually encircle each other.

Two exemplified embodiments of the seal according to the invention are clarified in greater detail on the basis of the enclosed drawings. They show the individual components to be considered, partially in a schematic representation.

BRIEF DESCRIPTION OF THE DRAWINGS

FIG. 2 shows the polymeric seal support, FIG. 3 the seal, and FIG. 4 the seal support and seal of FIGS. 2 and 3 interconnected.

DETAILED DESCRIPTION OF THE DRAWINGS

Figure 1:
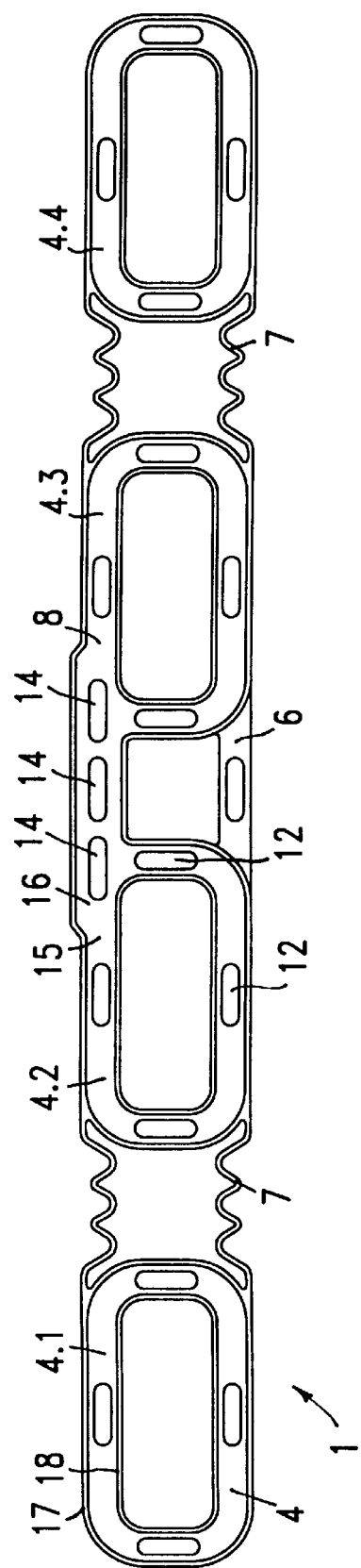
FIG. 1 depicts a first embodiment of the seal of the present invention, provided with a linear tolerance compensation.

A seal 1 made of an elastomeric material, which seals off the separating joint between the cylinder head of an internal combustion engine and an intake manifold 2 (FIG. 5) of a polymeric material, is shown in each of the exemplified embodiments according to FIGS. 1–4. The sealing surfaces 4 extend in both exemplified embodiments between two sealing lips 17, 18, which are mutually adjacent to one another with clearance and surround the intake pipes 5 of the intake manifold 2. Positioning projections 12, which blend together in one piece and are made of an elastomeric material, are arranged in the clearance space between the two sealing lips 17, 18.

FIG. 1 depicts a seal 1, which is made completely of an elastomeric material, in which case seal 1 seals off four intake pipes 5.1, 5.2, 5.3, 5.4 (FIG. 5), arranged in series, from the cylinder head. The two inner sealing surfaces 4.2, 4.3 are interconnected with dimensional stability by web segments 6, while the two outer sealing surfaces 4.1, 4.4 are affixed by way of a linear tolerance compensation segment 7 to the adjacent, inner sealing surface 4.2, 4.3. In the design shown in FIG. 1, it proves to be advantageous when the linear tolerance compensation segment 7 is reinforced, so that the seal 1 is designed to be substantially dimensionally stable and, as a result, can be easily assembled. A fiberglass-reinforced plastic can be used as a reinforcement, for example, in the linear tolerance compensation segment 7. A sealing action is not needed in the area of the linear tolerance compensation segment 7. The middle web segment 8, which is designed as a sealing bridge 16, has three perforations 14 which form a connection in this exemplified embodiment. One end of the connection is joined to the crankcase ventilation opening of the internal combustion engine (not shown), while the other end of the connection is joined to at least one intake opening of the internal combustion engine. By configuring the seal 1 near the cylinder head and by designing the intake manifold 2 accordingly, crankcase gas can be conducted, as needed, through preheated lines, so that there is no danger of icing, nor of damage to the crankcase due to excessive pressure. In this exemplified embodiment, the positioning projections 12 have an oval shape and can be forced to engage with recesses 13 (FIG. 5) in the intake flange 3.

Figure 2:
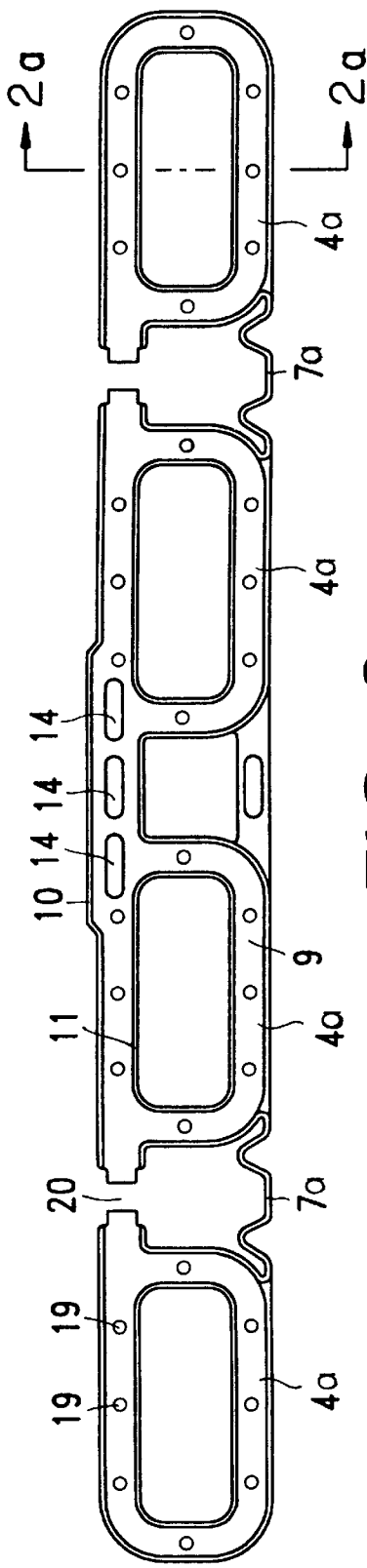
FIGS. 2 through 4 show another embodiment of a seal according to the invention.
Figure 2A:
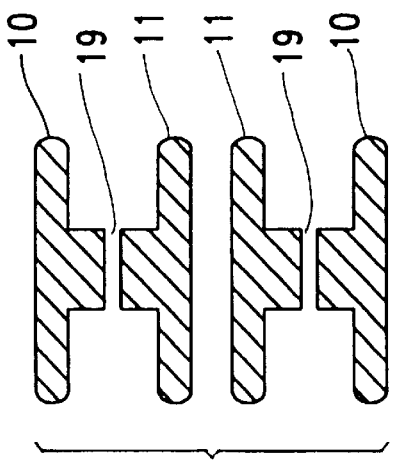

FIG. 2 shows a seal support 9, in which the web segments that interconnect the sealing surfaces 4a are also linear tolerance compensation segments 7a. In each case, the seal support 9 has a profile that opens out in a U-shape in the direction of the two adjoining component parts, so that the elastomeric material 15 is located in the depression of the U-shaped profile. The elastomeric material 15 engages openings 19 in the seal support 9 and is retained to the seal support via form locking.

On the side opposite the linear tolerance compensation segment 7, the seal support 9 is provided with a perforation 20, which is bridged over during the normal operational use of the elastomeric material 15, as described below.

Figure 3:
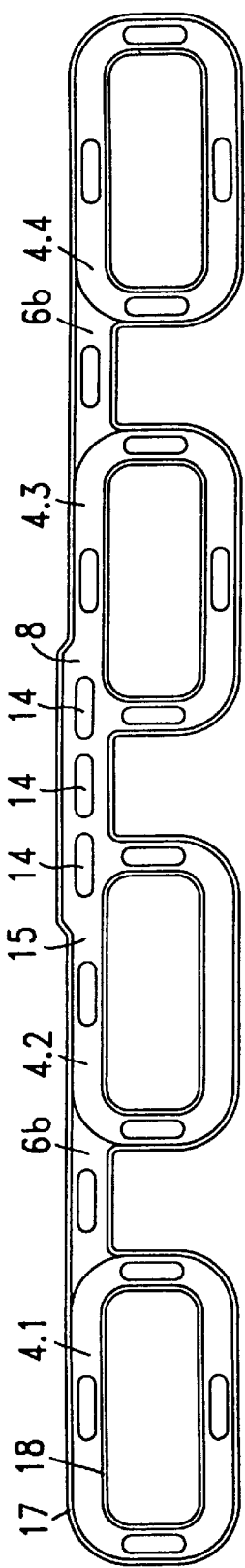
Figure 4:
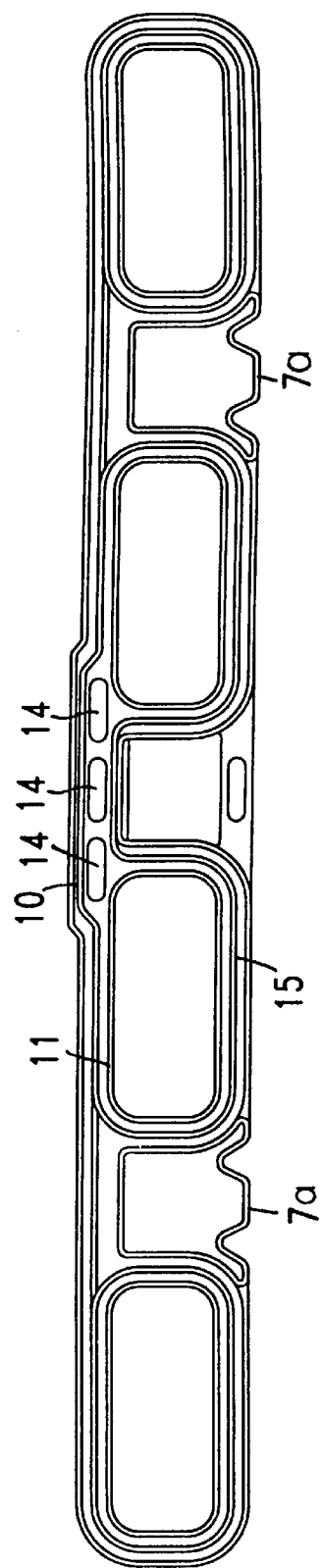

In FIG. 3, the sealing part of elastomeric material 15 in accordance with FIG. 4 is shown, in which case the sealing surfaces 4.1, 4.2, 4.3, 4.4 surrounding the intake pipes 5.1, 5.2, 5.3, 5.4 in the area of the flange 3 are each connected by flexible, elastic web segments 6b to blend into one another in one piece. The web segments 6b bridge over perforations 20 of the seal support 9 in accordance with FIG. 2.

FIG. 4 depicts the final assembled seal 1, in which case the linear compensation is produced on the one hand by means of the undulated tolerance compensation 7a of the seal support 9 and, on the other hand, in the opposite partial area by means of a recess in the seal support 9, which is penetrated by the elastomeric material 15 of the seal 1. A seal developed in such a manner has excellent dimensional stability and can be easily manipulated.

Figure 5:
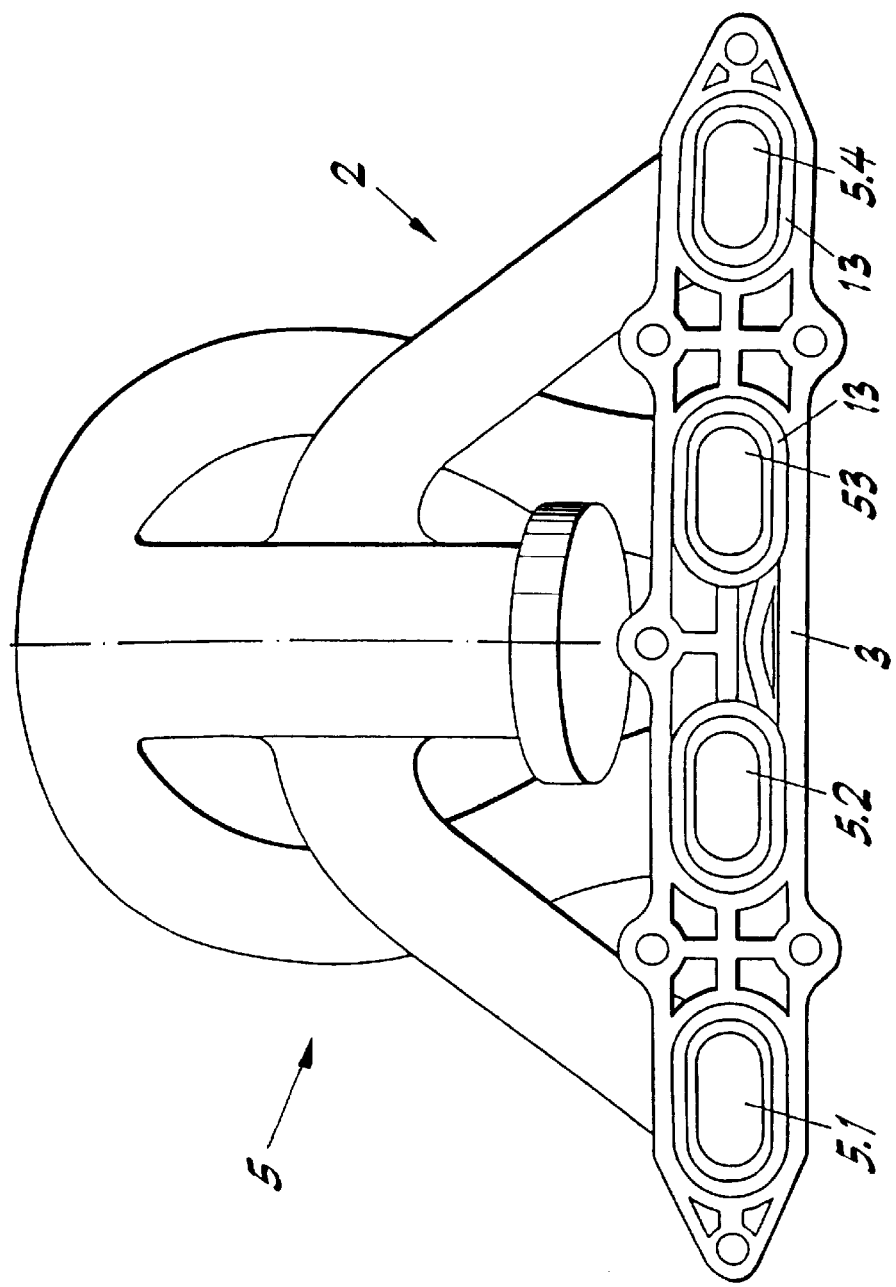
FIG. 5 shows an exemplified embodiment of an intake manifold of a polymeric material, to which the seal according to the present invention can be applied.

FIG. 5 illustrates an example of an intake manifold 2 that is provided with a flange 3. The intake pipes 5.1, 5.2, 5.3, 5.4 are each provided on the side of the flange 3 facing the cylinder head with a circumferential recess 13, into which the positioning projections 12 of the seal 1 are able to be snapped. The preassembled unit is then bolted to the cylinder head.

We claim:

1. A seal used to seal an intake manifold in a gas-tight manner on a cylinder head of an internal combustion engine, comprising:
   a one-piece elastomeric seal element, the seal element including sealing surfaces sealable against a side of an intake manifold flange to face the cylinder head, the sealing surfaces having a shape to sealingly surround a periphery of intake pipes of the intake manifold, the seal element further including at least one web segment having a first end connected to one of the sealing surfaces and having a second end connected to another of the sealing surfaces, the at least one web segment providing the only interconnection between the one of the sealing surfaces and the another of the sealing surfaces, the at least one web segment providing linear tolerance compensation and being flexurally pliant.

2. The seal according to claim 1, wherein:
   the seal element comprises four sealing surfaces arranged in series, the four sealing surfaces comprising two inner sealing surfaces joined by at least one middle web and two outer sealing surfaces, the at least one web segment comprising two web segments connecting the two outer sealing surfaces to the two inner sealing surfaces.

3. The seal according to claim 2, further comprising:
   a seal support of a polymeric material connected to the seal element.

4. The seal according to claim 3, wherein:
   the sealing surfaces and the middle web are adhesively joined to the seal support.

5. A seal used to seal an intake manifold in a gas-tight manner on a cylinder head of an internal combustion engine, comprising:
   a one-piece elastomeric seal element, the seal element including sealing surfaces sealable against a side of an intake manifold flange to face the cylinder head, the sealing surfaces having a shape to sealingly surround a periphery of intake pipes of the intake manifold, the seal element further including at least one web segment interconnecting one of the sealing surfaces with another of the sealing surfaces, the at least one web segment providing linear tolerance compensation and being flexurally pliant, the seal element including four sealing surfaces arranged in series, the four sealing surfaces including two inner sealing surfaces joined by at least one middle web and two outer sealing surfaces, the at least one web segment including two web segments connecting the two outer sealing surfaces to the two inner sealing surfaces; and
   a seal support of a polymeric material connected to the seal element, wherein at least one web segment is provided on the seal support.

6. A seal used to seal an intake manifold in a gas-tight manner on a cylinder head of an internal combustion engine, comprising:
   a one-piece elastomeric seal element, the seal element including sealing surfaces sealable against a side of an intake manifold flange to face the cylinder head, the sealing surfaces having a shape to sealingly surround a periphery of intake pipes of the intake manifold, the seal element further including at least one web segment interconnecting one of the sealing surfaces with another of the sealing surfaces, the at least one web segment providing linear tolerance compensation and being flexurally pliant, the seal element including four sealing surfaces arranged in series, the four sealing surfaces including two inner sealing surfaces joined by at least one middle web and two outer sealing surfaces, the at least one web segment including two web segments connecting the two outer sealing surfaces to the two inner sealing surfaces, the seal further including at least one positioning projection that is premolded in one piece with the seal element on a side of said seal element to face the intake manifold, the positioning projection being capable of being forced to engage a recess in the intake manifold flange that faces the cylinder head; and
   a seal support of a polymeric material connected to the seal element.

7. The seal according to claim 6, wherein:
   the at least one positioning projection comprises a plurality of positioning projections distributed uniformly in a circumferential direction.

8. A seal used to seal an intake manifold in a gas-tight manner on a cylinder head of an internal combustion engine, comprising:
   a one-piece elastomeric seal element, the seal element including sealing surfaces sealable against a side of an intake manifold flange to face the cylinder head, the sealing surfaces having a shape to sealingly surround a periphery of intake pipes of the intake manifold, the seal element further including at least one web segment interconnecting one of the sealing surfaces with another of the sealing surfaces, the at least one web segment providing linear tolerance compensation and being flexurally pliant, the seal element including four sealing surfaces arranged in series, the four sealing surfaces including two inner sealing surfaces joined by at least one middle web and two outer sealing surfaces, the at least one web segment including two web segments connecting the two outer sealing surfaces to the two inner sealing surfaces; and
   a seal support of a polymeric material connected to the seal element, wherein the middle web acts as a sealing bridge, the seal support and the sealing bridge including at least one perforation, the perforation being spaced so that it may be connected at one end to a crankcase ventilation of the internal combustion engine and at an other end to at least one inlet port of the internal combustion engine.

* * * * *